US007973239B2

(12) United States Patent
Koyama et al.

(10) Patent No.: US 7,973,239 B2

(45) Date of Patent: Jul. 5, 2011

(54) ULTRAFINE-COAXIAL-WIRE HARNESS, CONNECTING METHOD THEREOF, CIRCUIT-BOARD-CONNECTED BODY, CIRCUIT-BOARD MODULE, AND ELECTRONIC APPARATUS

(75) Inventors: Keiji Koyama, Osaka (JP); Hiroyuki Senba, Kanuma (JP); Takayoshi Koinuma, Kanuma (JP); Motoo Kobayashi, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 374 days.

(21) Appl. No.: 12/282,242

(22) PCT Filed: Feb. 8, 2008

(86) PCT No.: PCT/JP2008/052170

§ 371 (c)(1), (2), (4) Date: Sep. 9, 2008

(87) PCT Pub. No.: WO2008/082018

PCT Pub. Date: Jul. 10, 2008

(65) Prior Publication Data

US 2009/0101408 A1 Apr. 23, 2009

(30) Foreign Application Priority Data

Mar. 20, 2007 (JP) ................................ 2007-072515

(51) Int. Cl.
*H02G 15/02* (2006.01)

(52) U.S. Cl. ........................................ 174/74 R; 174/78

(58) Field of Classification Search .................... 174/28, 174/102 R, 74 R, 78, 84 R, 84 C
See application file for complete search history.

(56) References Cited

U.S. PATENT DOCUMENTS 3,221,290 A * 11/1965 Stark et al. .................... 439/275
5,281,762 A * 1/1994 Long et al. ...................... 174/78
5,347,711 A * 9/1994 Wheatcraft et al. ............ 29/843
5,710,393 A * 1/1998 Smith et al. ................. 174/74 R
5,768,771 A * 6/1998 O'Sullivan et al. ............ 29/828
5,781,991 A * 7/1998 Papon ............................ 29/828
5,815,916 A * 10/1998 Luc ................................ 29/828
5,940,963 A * 8/1999 Tolmie et al. ................... 29/828
7,772,496 B2 * 8/2010 Morijiri .................... 174/117 R

FOREIGN PATENT DOCUMENTS

JP 11-509030 8/1999
JP 2005-063878 3/2005
JP 2005-302604 10/2005

* cited by examiner

*Primary Examiner* — William H Mayo, III

(74) *Attorney, Agent, or Firm* — McDermott Will & Emery LLP

(57) ABSTRACT

A multicore ultrafine coaxial wire is formed by consolidating a plurality of ultrafine coaxial wires in a flat array. Each of the ultrafine coaxial wires has a center conductor, whose tip portion is exposed, an insulating layer, an outer conductor, and a covering. The harness has a grounding member that connects in common the outer conductors of the multicore ultrafine coaxial wire and an insulator frame that fixes the center conductors. End portions of an underside film and end portions of a topside film both of the insulator frame are provided with an alignment hole to align the center conductors with circuits on a substrate.

12 Claims, 7 Drawing Sheets

ULTRAFINE-COAXIAL-WIRE HARNESS, CONNECTING METHOD THEREOF, CIRCUIT-BOARD-CONNECTED BODY, CIRCUIT-BOARD MODULE, AND ELECTRONIC APPARATUS

RELATED APPLICATIONS

This application is the U.S. National Phase under 35 U.S.C. §371 of International Application No. PCT/JP2008/052170, filed on Feb. 8, 2008, which in turn claims the benefit of Japanese Application No. 2007-072515, filed on Mar. 20, 2007, the disclosures of which Applications are incorporated by reference herein.

TECHNICAL FIELD

The present invention relates to an ultrafine-coaxial-wire harness, a connecting method thereof, a circuit-board-connected body, a circuit-board module, and an electronic apparatus.

BACKGROUND ART

A connector has been known that connects a plurality of ultrafine coaxial wires to circuits on a substrate, as disclosed in Patent literature 1, for example.

As shown in FIG. 7, a connector 100 is fitted to a receptacle (not shown) to electrically connect a plurality of ultrafine coaxial wires 101 to a substrate. The connector 100 has (a) a housing 102 made of insulating material, such as a plastic material, (b) a plurality of conducting terminals 103 placed, with a specified pitch, along the width of the housing 102, and (c) a shield plate 104 covering the top surface of the housing 102. The individual conducting terminals 103 are placed in individual wire-housing recessed portions 105 that are formed so as to adjoin to one another, with a specified pitch, along the width of the housing. Thus, the individual conducting terminals 103 are aligned. Each of the ultrafine coaxial wires 101 to be connected to the conducting terminal 103 has a center conductor 107 to be connected to the conducting terminal 103 by using solder or the like, an insulating layer 108 covering the center conductor 107, an outer conductor 109 formed at the outside of the insulating layer 108, and a covering 110 covering the outer conductor 109. The individual ultrafine coaxial wires 101 are treated such that the individual center conductors 107 are individually connected to the corresponding individual conducting terminals 103 and the individual outer conductors 109 are connected to the connector 100 through a swaging member 111 collectively.

Patent literature 1: the published Japanese patent application Tokukai 2005-302604.

DISCLOSURE OF THE INVENTION

Problem to be Solved by the Invention

Ultrafine coaxial wires used in a mobile telephone and the like are connected to other wires, a substrate, or another member through a connector. In contrast, in the connector 100 in Patent literature 1, the individual outer conductors 109 of a plurality of ultrafine coaxial wires 101 are connected to the connector by swaging using the swaging member 111, which is a single common connecting metal plate, rather than using the soldering. Consequently, because no impregnation of solder to the outer conductor 109 occurs, the flexibility of the ultrafine coaxial wires 101 is not impaired. Patent literature 1 states that the above-described structure improves the workability of the ultrafine coaxial wires in a narrow connecting space.

Nevertheless, as the size of the apparatus is decreased, the space that can be secured as the connecting space is becoming smaller and smaller. To mitigate the connecting difficulty, ultrafine coaxial wires use a fine conductor having a diameter of American Wire Gauge (AWG) 40 to 45, for example. Under these circumstances, it becomes difficult to adopt the connecting structure through the connector as described in Patent literature 1. In view of the foregoing situation, to minimize the space for the connection, researchers and engineers are required to develop connectorless connection such as direct connection of the center conductors of individual ultrafine coaxial wires to circuits of an apparatus without using a connector.

An object of the present invention is to offer an ultrafine-coaxial-wire harness that enables connectorless connection to a substrate in a narrow space while maintaining the reliability and speediness of the operation, a circuit-board-connected body incorporating the harness, and so on.

Means to Solve the Problem

An ultrafine-coaxial-wire harness of the present invention comprises the following members:

(a) a plurality of ultrafine coaxial wires, each of which comprises the following members in the following order:
  - (a1) a center conductor whose end portion is exposed;
  - (a2) an insulating layer that has the shape of a tube and that is exposed at its end portion;
  - (a3) an outer conductor whose end portion is exposed; and
  - (a4) a covering;

(b) an insulator frame that fixes the individual center conductors in a state where the individual center conductors are arranged in a lateral direction; and (c) a grounding member that is connected to the exposed portions of the individual outer conductors.

In the harness, the insulator frame is provided with an alignment portion to align the center conductors to circuits on a substrate.

By employing the above structure, the center conductors can be aligned with circuits on a substrate, to which the ultrafine coaxial wires are connected, through the alignment portion speedily and easily. As a result, connectorless connection can be performed in a narrow space.

The above-described ultrafine-coaxial-wire harness may have the following structure:

(a) the insulator frame has a topside member and an underside member to hold the center conductors from both above and under;

(b) the underside member has a pair of long rectangular portions and a pair of end portions each of which is connected to the long rectangular portions at their ends; and (c) the pair of long rectangular portions and the pair of end portions together form a window portion such that they surround the window portion, which exposes the center conductors.

By employing this structure, under the condition that the center conductors are stably supported by the pair of long rectangular portions, in the window portion surrounded by the long rectangular portions and end portions, the center conductors can be connected to circuits on the substrate. Thus, the connection can be stabilized.

In particular, as the above-described alignment portion, an alignment hole may be provided at each of the pair of end portions of the insulator frame. The alignment holes improve the workability.

The foregoing grounding member may be provided with an engaging portion that engages with the exposed portions of the individual outer conductors. This structure allows the engaging portion to determine the arranging positions of the individual center conductors. By coupling the grounding member to the insulator frame, the individual center conductors can be connected to the substrate under the condition that the individual ultrafine coaxial wires are stably held.

A connecting method of the present invention for the ultrafine-coaxial-wire harness is a method of connecting the individual center conductors to individual circuit members of a circuit board, which has a plurality of circuit members, by performing alignment using the alignment portion as a reference. This method enables speedy and easy mounting of the ultrafine coaxial wires onto the circuit board.

The foregoing connecting method may perform, before performing the alignment using the alignment portion as a reference, (a) the arranging of the individual center conductors of the ultrafine coaxial wires between a pair of films by using guide holes as a reference to fix the center conductors and (b) the forming of alignment holes in the pair of films as the alignment portion. In this case, at the time the pair of films are bonded together, even if the films produce a slight positional deviation or wrinkles, by forming alignment holes separately and performing the alignment using the alignment holes as a reference, the center conductors can be reliably connected to the circuit members on the substrate.

A circuit-board-connected body of the present invention comprises the following members:

(a) a circuit board provided with a plurality of circuits; and (b) an ultrafine-coaxial-wire harness of the present invention provided on the circuit board.

This structure enables the offering of a circuit-board-connected body suitable for the miniaturization and thickness reduction of the apparatus to which the ultrafine-coaxial-wire harness is incorporated. The term “circuit board” is a generic name for a flexible printed-circuit board (FPC), a flexible flat cable (FFC), and a rigid printed-circuit board (PCB).

A circuit-board module of the present invention comprises the following members:

(a) a circuit-board-connected body of the present invention; and (b) an electronic component mounted on the circuit board.

An electronic apparatus of the present invention comprises the above-described circuit-board module. In these items, also, the present invention can offer a circuit-board module and an electronic apparatus suitable for the miniaturization and thickness reduction.

Effect of the Invention

By employing an ultrafine-coaxial-wire harness, a connecting method thereof, a circuit-board-connected body, a circuit-board module, or an electronic apparatus all of the present invention, connectorless connection to circuits on a substrate can be performed in a narrow space while maintaining the speediness and easiness of the operation.

BRIEF DESCRIPTION OF DRAWINGS

To facilitate the understanding, FIGS. 1 to 3C are drawn upside down.

FIG. 1 is a perspective view of an ultrafine-coaxial-wire harness according to an embodiment of the present invention.

FIGS. 3A to 3C are plan views and cross-sectional views together showing the steps of producing the ultrafine coaxial wire of this embodiment.

EXPLANATION OF SIGNS

Figure 1:
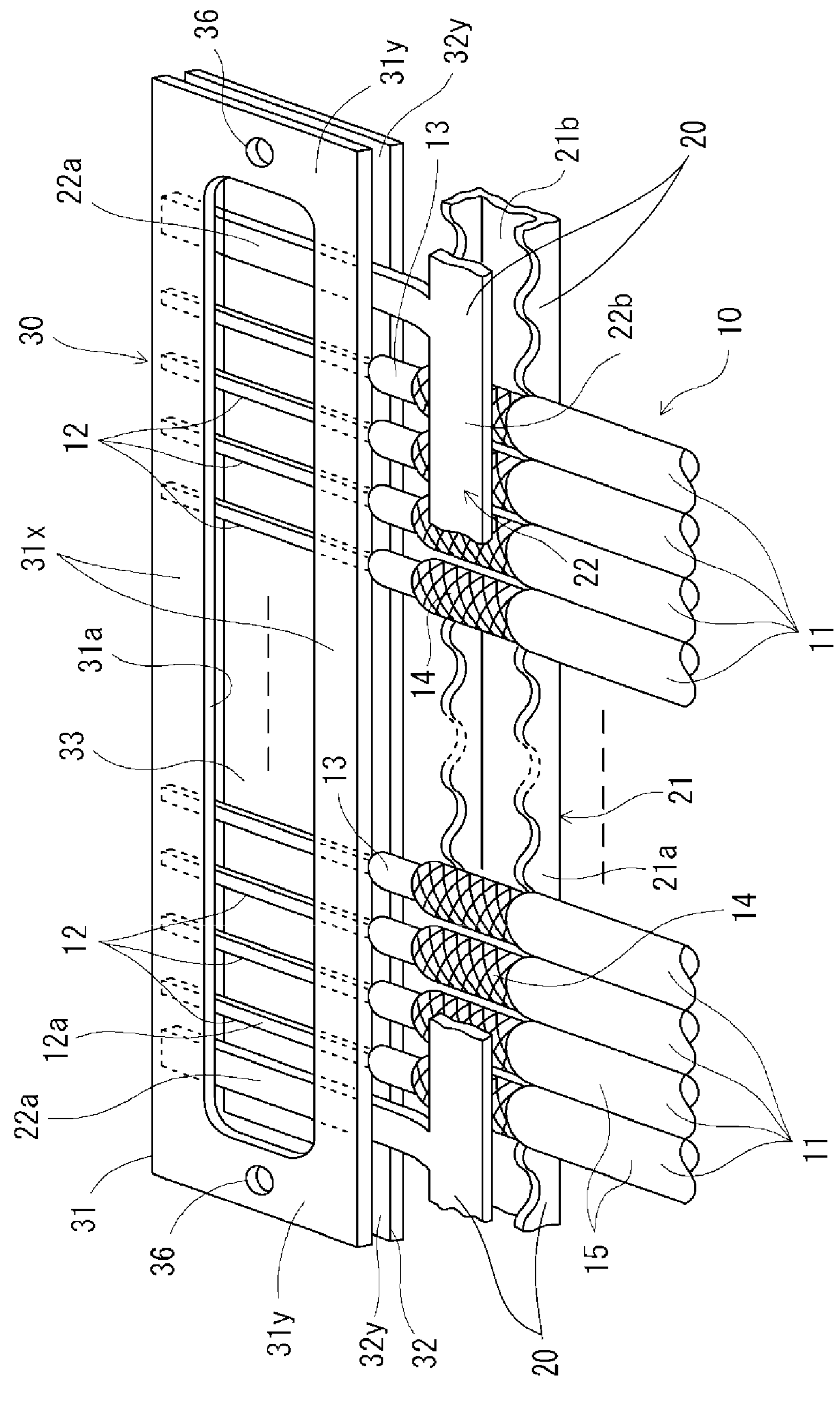

10: multicore ultrafine coaxial wire
11: Ultrafine coaxial wire
12: Center conductor
13: Insulating layer
14: Outer conductor
15: Covering
20: Grounding member
21: Engaging portion
21*a*: Vertical-wall portion
21*b*: Bottom-wall portion
22: Interconnecting portion
22*a*: Grounding strip
22*b*: Interconnecting strip
30: Insulator frame
31: Underside film
31*a*: Window portion
31*x*: Long rectangular portion
31*y*: End portion
32: Topside film
33: Pressing plate
36: Alignment hole
38: Guide hole
40: Adhesive tape
50: Rigid printed-circuit board
51: Rigid substrate
52: Signal circuit
53: Grounding circuit
54: Alignment hole
60: Assembling jig
61: Positioning stage
62: Pin
70: Heater tip

BEST MODE FOR CARRYING OUT THE INVENTION

Embodiment

Ultrafine-Coaxial-Wire Harness

Figure 2A:
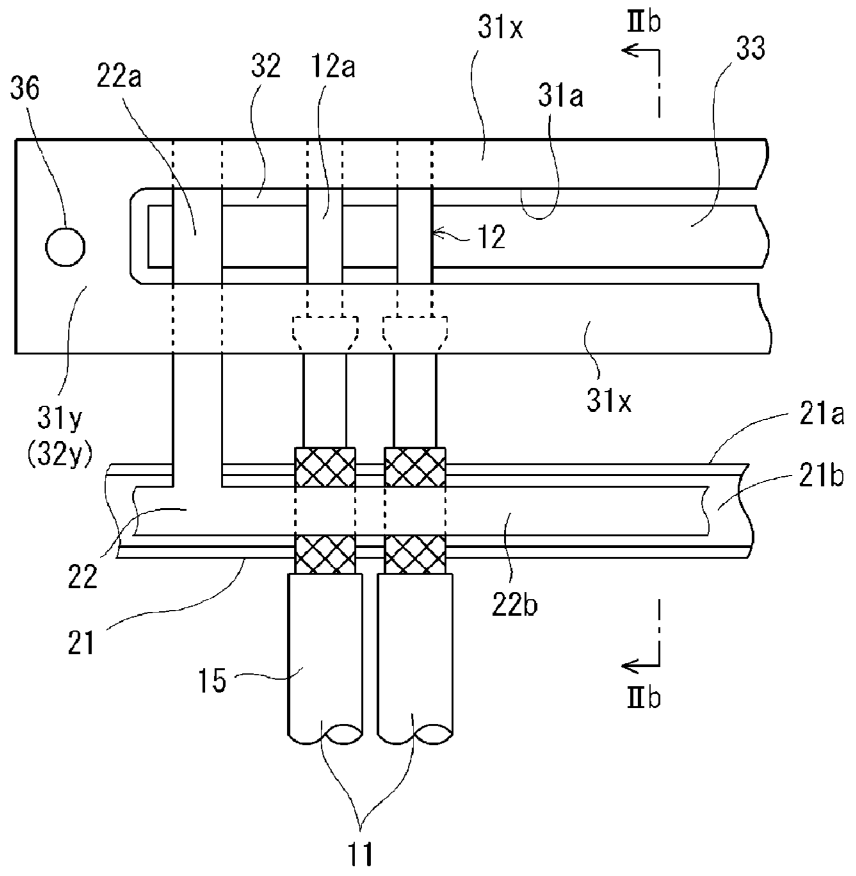
FIG. 2A is a plan view of the ultrafine-coaxial-wire harness shown in FIG. 1.

FIG. 1 is a perspective view of an ultrafine-coaxial-wire harness according to an embodiment of the present invention. FIG. 2A is a plan view of the ultrafine-coaxial-wire harness shown in FIG. 1, and FIG. 2B is a cross section viewed from the line II b-II b in FIG. 2A.

Figure 2B:
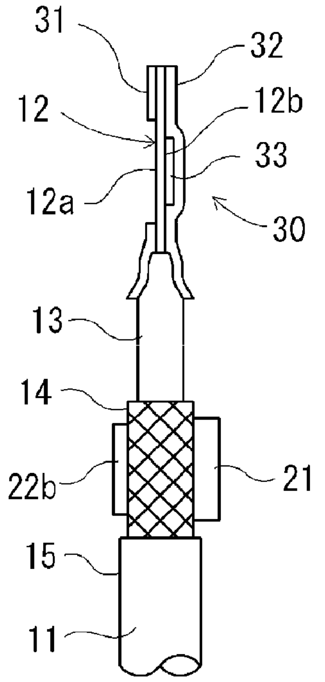
FIG. 2B is a cross section viewed from the line II b-II b in FIG. 2A.

As shown in FIGS. 1, 2A, and 2B, a multicore ultrafine coaxial wire 10 according to this embodiment is formed by consolidating a plurality of ultrafine coaxial wires 11 in a flat array. Each of the ultrafine coaxial wires 11 has a center conductor 12 having a cross section of a nearly perfect circle, an insulating layer 13 covering the center conductor 12, an outer conductor 14 that is formed around the insulating layer 13 and that is grounded, and a covering 15 covering all the members. The end portion of the center conductor 12 is exposed, and the exposed portion is flattened by rolling in a direction of the flat array of the ultrafine coaxial wires. Nevertheless, the exposed portion of the center conductor 12 is not necessarily required to be flat. In addition, the insulating layer 13 and the outer conductor 14 are also exposed in the shape of a step in succession out of the covering 15.

The ultrafine-coaxial-wire harness is also provided with (a) a grounding member 20 that connects in common all the exposed portions of the outer conductors 14 of the multicore ultrafine coaxial wire 10 and (b) an insulator frame 30 that fixes the center conductors 12.

The grounding member 20 has (a) an engaging portion 21 formed by bending, at a nearly right angle, both side portions of a plate material made of metallic conductor to obtain the shape of a channel bar and (b) an interconnecting portion 22 that has an interconnecting strip 22*b* connected to a part of the engaging portion 21 and grounding strips 22*a* extending in a direction almost perpendicular to the engaging portion 21 at a position having nearly the same height as that of the center conductors 12. The engaging portion 21 has vertical-wall portions 21*a* each having the shape of waves and a bottom-wall portion 21*b*. The vertical-wall portions 21*a* each have a large number of wave-shaped grooves formed with a fixed pitch to engage with the outer conductors 14. The interconnecting strip 22*b* of the interconnecting portion 22 is bonded to the vertical-wall portions 21*a* at both sides by brazing. The individual grooves in the engaging portion 21 are connected to the individual outer conductors 14 by soldering. An adhesive is applied to the outer conductor 14's exposed portion to which no soldering is performed. In this embodiment, the engaging portion 21 maintains the spacing between the ultrafine coaxial wires with a specified pitch, thereby determining the arranging positions of the individual center conductors 12. In the structure shown in FIG. 1, the engaging portion 21 is provided only at one side. Nevertheless, another structure may be employed in which a pressing member having another engaging portion or a pressing member formed of a flat plate is also provided at the other side so that the outer conductors 14 can be held from both sides.

The insulator frame 30 has (a) an underside film 31, which is an underside member that supports connecting surfaces 12*a* of the center conductors 12, (b) a topside film 32, which is a topside member that holds pressure-receiving surfaces 12*b* of the center conductors 12, and (c) a pressing plate 33 that is placed between the topside film 32 and the pressure-receiving surfaces 12*b* of the center conductors 12. The underside film 31 is formed of (a) a pair of long rectangular portions 31*x*, which extend in a direction nearly perpendicular to the center conductors 12, and (b) a pair of end portions 31*y* that connect the long rectangular portions 31*x* at their both ends. A window portion 31*a* is formed inside a frame formed by the long rectangular portions 31*x* and the end portions 31*y* to allow the center conductors to be connected to circuits on a substrate. Each of the end portions 31*y* is provided with an alignment hole 36 to align the individual center conductors 12 with the individual circuit members on the substrate. The topside film 32 has no window portion but has an outside dimension nearly equal to that of the underside film. The alignment holes 36 also penetrate through both end portions 32*y* of the topside film 32. The underside film 31, the topside film 32, and the pressing plate 33 are individually fixed to the center conductors 12 with a thermosetting resin (such as an epoxy resin). The grounding strips 22*a* of the interconnecting portion 22 of the grounding member 20 are also fixed to the underside film 31 and the topside film 32 with a thermosetting resin.

The ultrafine coaxial wire 11 uses a fine conductor having a diameter of American Wire Gauge (AWG) 40 to 46, for example. The center conductor 12 positioned at the center of the ultrafine coaxial wire 11 is usually formed of a copper stranded wire by choice because it is flexible and endures bending. Nevertheless, this embodiment uses a solid wire, which is resistant to deformation. The flattened portion of the center conductor has a thickness of about 75 μm, for example, and the grounding strip 22*a* of the interconnecting portion 22 also has a comparable thickness.

As the underside film 31 and the topside film 32, a thermosetting resin, such as polyester or polyimide, may be used. The underside film 31 and the topside film 32 are fixed to the center conductors 12 by using an adhesive (a thermosetting resin, such as an epoxy resin, or a thermoplastic resin). In other words, the flattened center conductors 12 are bonded to the topside and underside films through the adhesive applied to the topside and underside of the center conductors 12. Thus, the center conductors 12 are securely held. Because the center portion of the underside film 31 forms the window portion 31*a*, as shown in FIG. 2A, the window portion 31*a* exposes all the center conductors 12 and the grounding strips 22*a* of the interconnecting portion 22 of the grounding member 20.

As shown in FIGS. 2A and 2B, it is desirable to place the pressing plate 33 between the topside film 32 and the pressure-receiving surfaces 12*b* of the center conductors 12. The pressing plate 33 has a length sufficient to include the total width of the center conductors 12 and the grounding strips 22*a* of the interconnecting portion 22 of the grounding member 20 (in a left-to-right direction in FIG. 2A) (the grounding strips 22*a* are placed at both sides of the group of the center conductors 12). Furthermore, the pressing plate 33 has a width to such an extent that it covers the most part of the exposed portions of the center conductors 12 and the grounding strips 22*a* of the interconnecting portion 22 in the window portion 31*a*. This structure increases the strength of the portion sandwiched between the underside film 31 and the topside film 32. When the connecting surfaces 12*a* of the center conductors 12 are pressed to the circuits on the substrate, the elastic force of the pressing plate 33 can maintain a good condition of the contact between the center conductors 12 and the circuits and between the grounding strips 22*a* of the interconnecting portion 22 and the circuits. Thus, the center conductors 12 and the grounding strips 22*a* can be securely connected electrically to the circuits.

Production Method

Figure 3A:
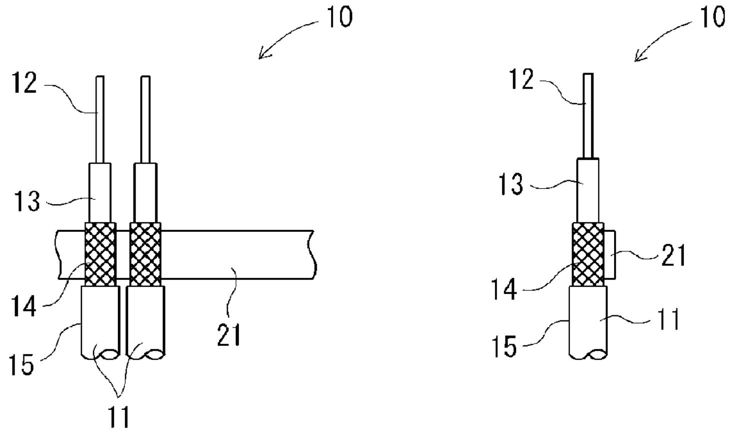
Figure 3B:
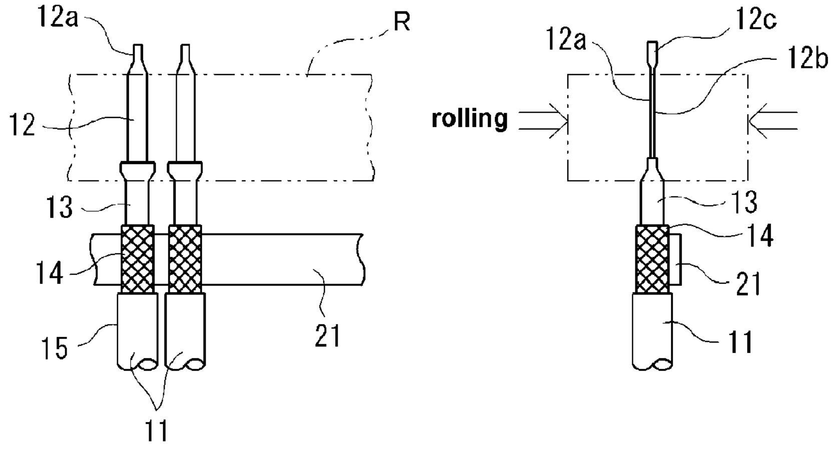
Figure 3C:
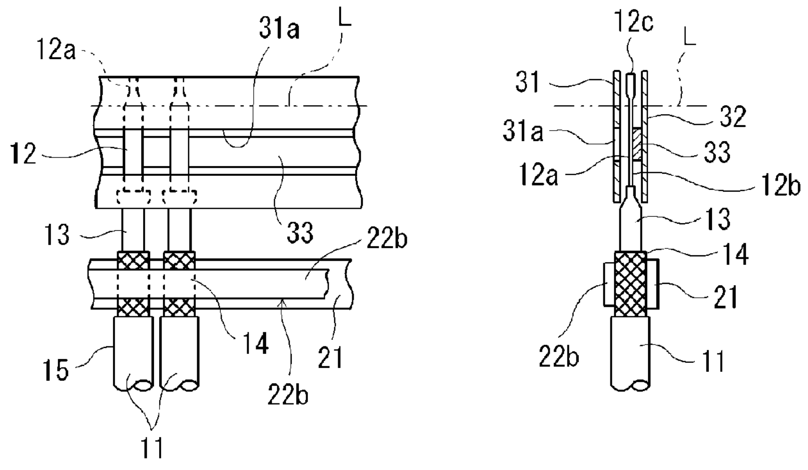

FIGS. 3A to 3C are plan views and cross-sectional views together showing the steps of producing the ultrafine coaxial wire of this embodiment. However, FIGS. 3A to 3C omit the illustration of the grounding strips 22*a* of the interconnecting portion 22 of the grounding member 20.

First, in the step shown in FIG. 3A (the step of arrangement), a plurality of ultrafine coaxial wires 11 (two wires in FIG. 3A) are arranged in a flat array. A slit having a specified length is made in the covering 15 by burning through it with a laser to remove the slit portion. Specified lengths of the outer conductor and the insulating layer 13 are also removed by cutting them using the heat of a laser. Thus, the outer conductor 14, the insulating layer 13, and the center conductor 12 are exposed in succession in the shape of a step with the specified length. The individual outer conductors 14 are engaged with the individual grooves of the engaging portion 21 of the grounding member 20. The outer conductors 14 are fixed to the engaging portion 21 with solder or a conductive adhesive. As a result, the individual ultrafine coaxial wires 11 are arranged with a fixed pitch (the same pitch as that of the circuits on the substrate). In other words, the center conductors 12 are arranged with the same pitch as that of the circuits on the substrate.

Next, in the step shown in FIG. 3B (the step of rolling), a rolling region R shown in FIG. 3B is rolled. The rolling region R includes the exposed region of the center conductor 12 excluding the tipmost portion 12*c* and a part of the tip portion of the insulating layer 13. The rolling operation flattens the exposed tip portion of the center conductor.

Subsequently, in the step shown in FIG. 3C (the step of covering), the pressing plate 33 is placed on the pressure-receiving surfaces 12*b* of the flattened portion of the center conductors 12. The topside film 32 is bonded to the flattened center conductors 12 and the rolled portions of the insulating layers 13. Then, the underside film 31 is bonded to the foregoing members in such a way that its position coincides with the topside film 32. In this case, the underside film 31 is positioned such that the window portion 31*a* exposes the connecting surfaces 12*a* of the center conductors 12.

Finally, the center conductors 12, the underside film 31, and the topside film 32 are cut at a cutting line L to remove the tipmost portions 12*c* of the center conductors 12.

Figure 4A:
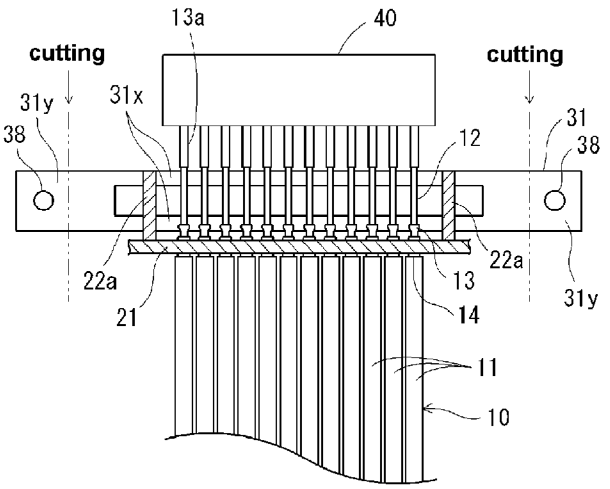
FIGS. 4A and 4B are plan views showing the detail of the step shown in FIG. 3C in succession.
Figure 4B:
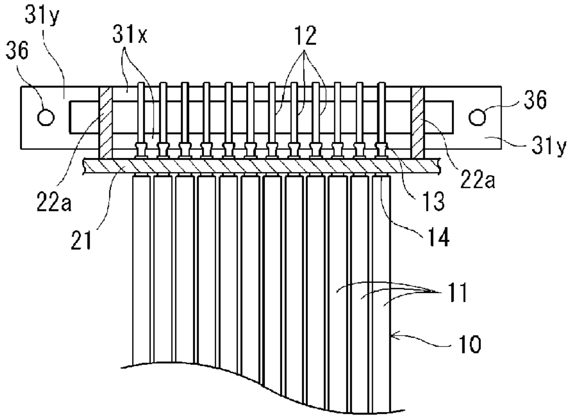

The step shown in FIG. 3C is explained in further detail below. FIGS. 4A and 4B are plan views showing the detail of the step shown in FIG. 3C in succession. To facilitate the understanding, in FIGS. 4A and 4B, the insulator frame 30 is shown only by the underside film 31, with the illustration of the topside film 32 and the pressing plate 33 being omitted.

Although the illustration is omitted in the steps shown in FIGS. 3A and 3B, in the actual process, as shown in FIG. 4A, the tipmost portions 13*a* of the insulating layers 13 cover the tipmost portions 12*c* (see FIG. 3C) of the center conductors 12 of the ultrafine coaxial wires 11. An adhesive tape 40 is applied to the tipmost portions 13*a*, so that the ultrafine coaxial wires 11 are arranged in a flat array. As shown in FIG. 4A, the underside film 31 is placed at the rolling region R shown in FIG. 3B. Then, the center conductors 12, the grounding strips 22*a* of the interconnecting portion 22, and the insulating layers 13 are placed on the underside film 31. Both end portions of the underside film 31 are provided with guide holes 38 to align the underside film 31 with the multicore ultrafine coaxial wire 10 and the grounding member 20.

Next, the pressing plate 33 is placed on the center conductors 12 and the grounding strips 22*a* of the interconnecting portion 22. Then, an adhesive such as an epoxy resin is applied onto these members. Subsequently, the topside film 32 is placed on them. FIG. 4B omits the illustration of the topside film 32 and the pressing plate 33. However, the grounding strips 22*a* of the interconnecting portion 22 of the grounding member 20 and the center conductors 12 are sandwiched between the underside film 31 and the pressing plate 33 (see FIGS. 2A and 2B). Both end portions 32*y* (see FIG. 1) of the topside film 32 (not shown) are also provided with guide holes 38 at the same places as those of the underside film 31. Under the condition that the guide holes 38 are coupled with pins of a working jig (not shown) and that the alignment is performed, the topside film 32 is superimposed on the underside film 31 at a specified position. Thus, a state shown in the right-side diagram in FIG. 3C is produced. The guide holes 38 also perform the alignment between the engaging portion 21 of the grounding member 20 and the underside film 31 and between the engaging portion 21 of the grounding member 20 and the topside film 32. Under this condition, the underside film 31, the topside film 32, the pressing plate 33, the center conductors 12, and the insulating layers 13 (the flattened portions) are pressed from both sides to fix the individual contacting portions with an epoxy resin or the like. In this case, the pressing plate 33 is not necessarily required.

Next, as shown in FIGS. 4A and 4B, when the center conductors 12, the underside film 31, and the topside film 32 are cut at the cutting line L shown in FIG. 3C, both end portions of the underside film 31 and the topside film 32 where the guide holes 38 are formed are removed by cutting. Then, alignment holes 36 are newly formed at both end portions 31*y* of the underside film 31 after the alignment is performed by using the engaging portion 21 of the grounding member 20 as a reference, i.e., the alignment is performed with the arranged positions of the center conductors 12. At this moment, although not shown in FIG. 4B, both end portions 32*y* of the topside film 32 (see FIG. 1), which is superimposed on the underside film 31, are also provided with the alignment holes 36 that penetrate through the film.

Figure 5A:
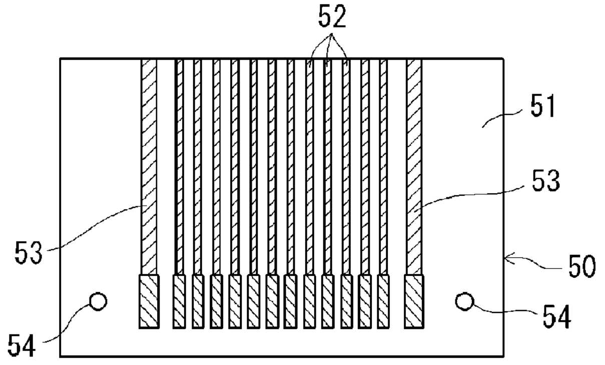
FIGS. 5A to 5D are plan views and cross-sectional views all showing the method of coupling the ultrafine coaxial wires of this embodiment to rigid printed circuits.

FIGS. 5A to 5D are plan views and cross-sectional views all showing the method of producing a circuit-board-connected body in which the ultrafine coaxial wires of this embodiment are coupled to rigid printed circuits. As shown in FIG. 5A, a rigid printed-circuit board 50 has (a) a rigid substrate 51 and (b) signal circuits 52 and grounding circuits 53 formed on the rigid substrate 51. The rigid substrate 51 is provided with a pair of alignment holes 54 having the same spacing and size as those of the alignment holes 36. Solder layers are formed at the tip portions of the signal circuits 52 and the grounding circuits 53.

Figure 5B:
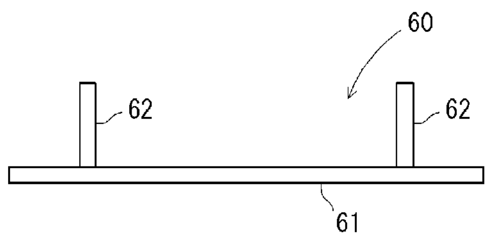

As shown in FIG. 5B, an assembling jig 60 is prepared that has a positioning stage 61 and a pair of pins 62 having the same pitch as that of but a size slightly larger than that of the alignment holes 36 and 54.

Figure 5C:
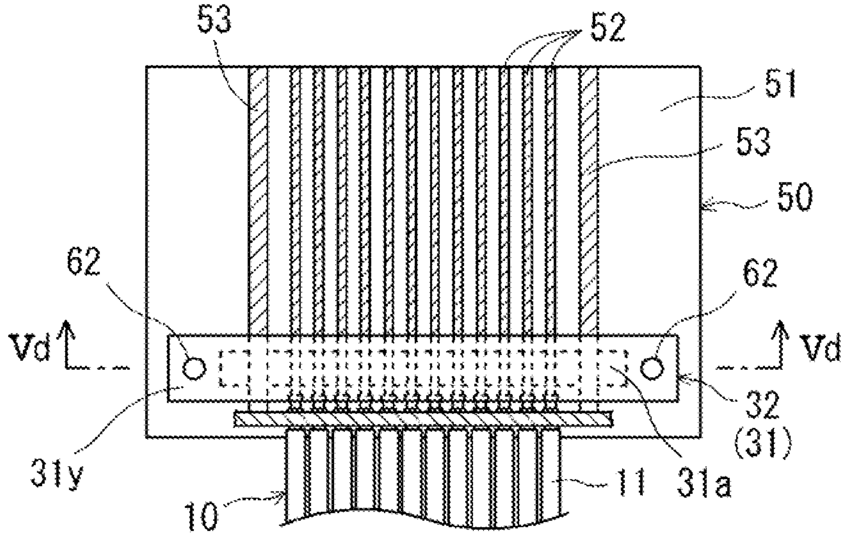

As shown in FIG. 5C, the alignment holes 36 and 54 are slid onto the pair of pins 62. Thus, the multicore ultrafine coaxial wire 10 is placed on the rigid printed-circuit board 50. At this moment, because the window portion 31*a* is an empty space, the pins 62 and the alignment holes 36 and 54 perform the alignment such that (a) the individual center conductors 12 are positioned directly over the individual signal circuits 52 with a gap and (b) the grounding strips 22*a* of the interconnecting portion 22 of the grounding member 20 are positioned directly over the grounding circuits 53 with a gap. Solder is placed between the signal circuits 52 and the center conductors 12 and between the grounding circuits 53 and the grounding strips 22*a* of the interconnecting portion 22.

Figure 5D:
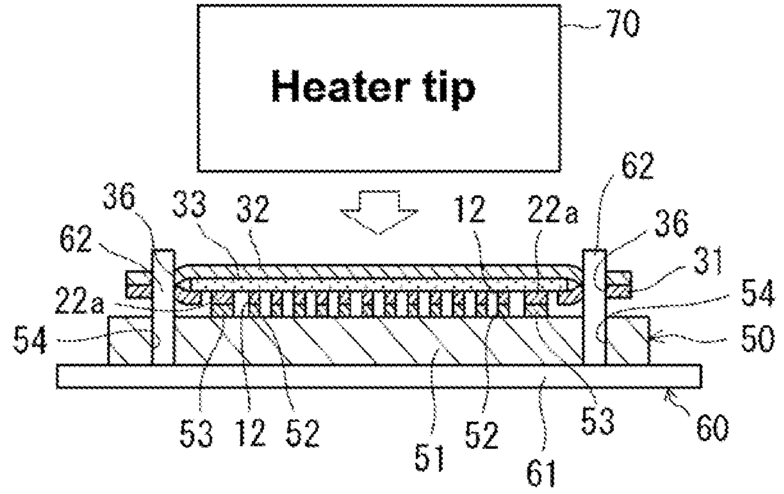

FIG. 5D is a cross section viewed from the line Vd-Vd shown in FIG. 5C. As shown in FIG. 5D, when the topside film 32 is pressed with a heater tip 70, at the window portion 31*a*, the center conductors 12 are bonded to the signal circuits 52 with solder and the grounding strips 22*a* of the interconnecting portion 22 are bonded to the grounding circuits 53 with solder. This operation electrically connects the multicore ultrafine coaxial wire 10 to the rigid printed-circuit board 50 in both the signal lines and grounding lines.

According to the ultrafine-coaxial-wire harness in this embodiment, the alignment holes 36 to align the center conductors 12 to the signal circuits 52 are provided in the underside film 31 and the topside film 32 of the insulator frame 30 for supporting the center conductors 12 of the ultrafine coaxial wires 11. The alignment holes 36 enable a correct and speedy operation of placing the multicore ultrafine coaxial wire 10 on the members such as the rigid printed-circuit board 50. Furthermore, the operation does not require a connector, and the space needed to the coupling can be a narrow space confined in the window portion 31*a* of the underside film 31.

The basic effect of the present invention can be exercised even when the center conductors 12 are fixed with an adhesive to the insulator frame 30 in this embodiment only by using the topside film 32, without using the underside film 31. However, because the insulator frame 30 is provided with the topside film 32 (the topside member) and the underside film 31 (the underside member) both for holding the center conductors from both above and under, the center conductors 12 can be held reliably. The presence of the films 31 and 32 enables the tip portion of the ultrafine-coaxial-wire harness to function in such a manner as an FPC does, so that the harness can be directly connected to or disconnected from a ZIF connector mounted on the substrate. In this case, because the underside film 31 has a pair of long rectangular portions 31*x* and a pair of end portions 31*y* that are connected to the long rectangular portions 31*x* at their both ends and the window portion 31*a* is formed inside a frame formed by the long rectangular portions 31*x* and the end portions 31*y* to allow the center conductors 12 to be exposed, the center conductors 12 can be securely brought into contact with the signal circuits 52 within the window portion 31*a*.

In addition, even when the window portion 31*a* is not formed in the insulator frame 30 in this embodiment, more specifically, even when the insulator frame 30 has a structure in which the underside film 31 is provided with only one member of the long rectangular portions 31*x*, the center conductors 12 can be held with the insulator frame 30. Nevertheless, when the underside film 31 has a pair of long rectangular portions 31*x*, the movement of the individual center conductors 12 can be prevented. As a result, the pitch between the center conductors 12 can be maintained at a fixed value more reliably.

The alignment of the center conductors 12 is not necessarily required to be carried out by using the engaging portion 21 of the grounding member 20. The center conductors 12 can be aligned by using a member of the insulator frame 30. Even in that case, the basic effect of the present invention can be exercised. Nevertheless, when the center conductors 12 are aligned by not only engaging the individual outer conductors 14, which have a relatively large size, of the individual ultrafine coaxial wires 11 with the engaging portion 21 of the grounding member 20 but also coupling the engaging portion 21 to the insulator frame 30 through the interconnecting portion 22 of the grounding member 20, the pitch between the center conductors 12 can be maintained stably.

In addition, because the grounding strips 22*a* of the interconnecting portion 22 of the grounding member 20 are connected to the grounding circuits 53 on the rigid substrate 51, the grounding line can be connected smoothly. However, the method of connecting the grounding line is not limited to the structure of this embodiment; various structures can be employed. For example, in a structure in which the grounding member 20 is not provided with the grounding strips 22*a* of the interconnecting portion 22, a grounding circuit is formed at a position corresponding to that of the interconnecting strip 22*b* of the interconnecting portion 22. A solder layer is formed on the grounding circuit. Finally, the interconnecting strip 22*b* is connected to the grounding circuit by thermocompression bonding. This method can further decrease the space needed for the connection.

Furthermore, as shown in FIGS. 4A and 4B and FIGS. 5A to 5D, when the insulator frame 30 is coupled to the multicore ultrafine coaxial wire 10 and the grounding member 20, the guide holes 38 of the insulator frame 30 are used. Thus, the underside film 31 can be bonded with the topside film 32 smoothly. Nevertheless, after the completion of the bonding, the underside film 31 and the topside film 32 sometimes produce a slight positional deviation or wrinkles due to the adhesive. To solve this problem, in addition to the guide holes 38, the alignment holes 36 are formed that are aligned with the arranged position of the center conductors 12. The alignment holes 36 enable the center conductors 12 to be connected reliably to the circuit members on the rigid substrate 51 such as the signal circuits 52.

In other words, the bonding-together-use alignment portion (the guide holes 38) is used to align the center conductors 12 with the insulator frame 30 in the step of fixing, using an adhesive, the center conductors 12 and the insulator frame 30 having the underside film 31 and the topside film 32. On the other hand, the mounting-use alignment portion (the alignment holes 36) is used to align the center conductors 12 with the circuits (the signal circuits 52) on the substrate in the step of connecting the multicore ultrafine coaxial wire 10 to the circuit member on the substrate. The above-described method enables the secure connection of the multicore ultrafine coaxial wire 10 to the circuit member on the substrate.

Nevertheless, the alignment portion of the present invention is not limited to the alignment holes 36 and the guide holes 38 in this embodiment. Any form may be used providing that it engages with the engaging member of the working jig.

In the above-described embodiment, as an adhesive for fixing the underside film 31 and the topside film 32 to the center conductors 12, an epoxy resin, which is a thermosetting resin, is used to heat and harden it. However, a thermoplastic resin, such as polyethylene or polypropylene, may be used to fuse it by heating and melting.

Structure of Circuit Board Module and Electronic Apparatus

Figure 6:
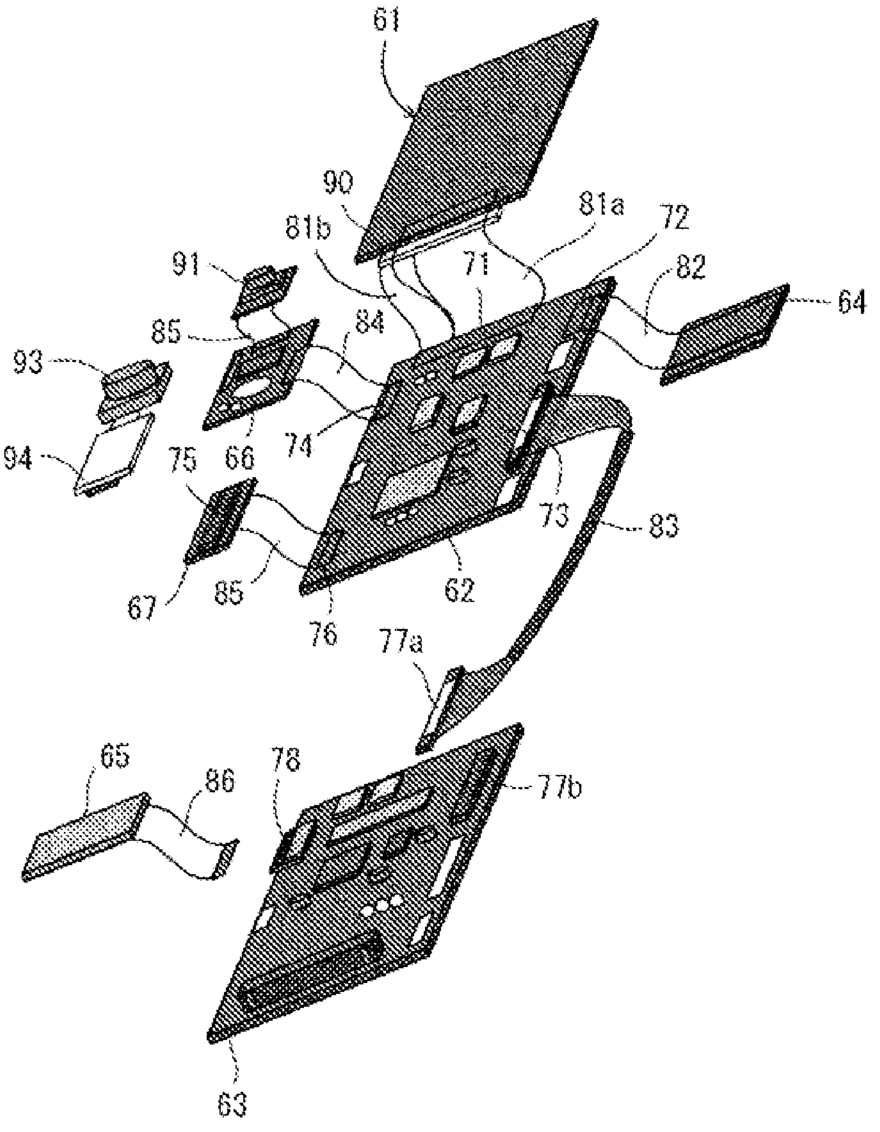
FIG. 6 is a perspective view showing the detail of the connection between various circuit boards contained in an electronic apparatus functioning as a mobile telephone.
Figure 7:
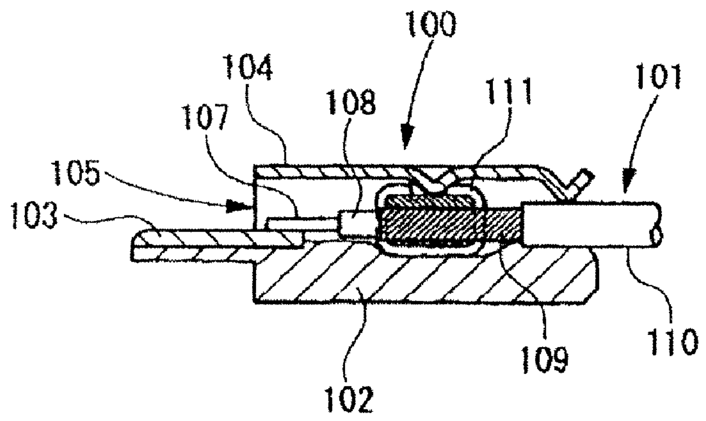
FIG. 7 Prior Art
FIG. 7 is a cross-sectional view showing the connection structure of a conventional ultrafine coaxial wire, the structure being disclosed in Patent literature 1.

FIG. 6 is a perspective view showing the detail of the connection between various circuit boards contained in an electronic apparatus functioning as a mobile telephone.

The circuit-board module of this embodiment contained in an electronic apparatus constitutes a part of an integrated module that has the following components connected by using FPCs: (a) main display 61 that displays the screen of a mobile telephone provided with an LED 90, (b) a first sub-PCB 62 and a main PCB 63, both of which carry out the principal control in the electronic apparatus, (c) a subdisplay 64 that displays additional information of the mobile telephone, (d) an antenna 65, (e) an incamera-controlling PCB 66 for controlling an incamera 91, and (f) an attached-circuit-use PCB 67. A self-contained memory, a baseband LSI (Large-Scale Integration), a power control IC (Integrated Circuit), a sound generator IC, an RF-receiving LSI, an RF-transmitting LSI, a power amplifier, a switching IC, and so on are divided and placed in the first sub-PCB 62 and the main PCB 63.

Although not included in the integrated module, an outcamera 93 and a control circuit 94 for controlling the outcamera 93 are placed in the electronic apparatus.

The first sub-PCB 62 is connected to the main PCB 63 through an ultrafine coaxial wire 83 or an FPC. The connecting portion between the ultrafine coaxial wire 83 and the first sub-PCB 62 is provided with an ultrafine-coaxial-wire-use connector 73. As shown in a state in which the ultrafine coaxial wire 83 and the main PCB 63 are disassembled at the connecting portion, the ultrafine-coaxial-wire-use connector 73 is composed of (a) an ultrafine-coaxial-wire harness 77*a* that includes (a1) a grounding member and (a2) an insulator frame fixing the center conductors of the ultrafine coaxial wire and (b) a coaxial-wire-connecting portion 77*b* at the substrate side.

The main display 61 is electrically connected to the first sub-PCB 62 through two FPCs 81*a* and 81*b*. The two FPCs 81*a* and 81*b* are (a) divided into a liquid-crystal-panel side and an LED-90 side at the main display 61 and (b) connected to a common connector 71 at the first sub-PCB 62.

The first sub-PCB 62 is connected to the subdisplay 64 through an FPC 82 and a connector 72. The first sub-PCB 62 is also connected to the incamera-controlling PCB 66 through an FPC 84 and a connector 74. The first sub-PCB 62 is also connected to the attached-circuit-use PCB 67 through an FPC 85 and connectors 75 and 76. The main PCB 63 is connected to the antenna 65 through an FPC 86 and a connector 78.

As the rigid substrate for the PCBs, not only a glass-reinforced epoxy board but also a paper-reinforced phenol board, a paper-reinforced epoxy board, a fluororesin board, an alumina board, and so on are used. As the material for the wiring, a copper alloy is usually used. However, the material is not limited to this material. As the flexible substrate, not only a polyimide board but also a polyester board (for low temperatures), a glass-reinforced epoxy board (a thin plate), and so on are used.

As described above, when the ultrafine-coaxial-wire harness of this embodiment is incorporated into a circuit-board module, which is a part of an integrated module, or an electronic apparatus having a circuit-board module, the ultrafine-coaxial-wire harness can be mounted on a circuit board correctly and speedily on a connectorless basis.

The above-described electronic apparatus includes, in addition to a mobile telephone, a camera, such as a digital camera and a camcorder, a portable audio player, a portable DVD player, and a portable laptop.

It is to be considered that the above-disclosed structure of an embodiments of the present invention is strictly illustrative and that the scope of the present invention is not limited to the scope of the above description. The scope of the present invention is shown by the description of the scope of the appended claims. Accordingly, the present invention is intended to cover all revisions and modifications included within the meaning and scope equivalent to the description of the scope of the claims.

INDUSTRIAL APPLICABILITY

The present invention can be employed not only for a mobile telephone but also for electronic apparatuses such as a camera, including a digital camera and a camcorder, a portable audio player, a portable DVD player, and a portable laptop.

The invention claimed is:

1. An ultrafine-coaxial-wire harness, comprising:
- a plurality of ultrafine coaxial wires, each of which comprises the following members in the following order:
  - a center conductor whose end portion is exposed;
  - an insulating layer that has the shape of a tube and that is exposed at its end portion;
  - an outer conductor whose end portion is exposed; and
  - a covering;
- an insulator frame that fixes the individual center conductors of the individual ultrafine coaxial wires in a state where the individual center conductors are arranged in a lateral direction;
- a grounding member that is connected to the exposed portions of the individual outer conductors of the individual ultrafine coaxial wires; and
- an alignment portion provided in the insulator frame to align the center conductors to circuits on a substrate, wherein:
- the insulator frame has a topside member and an underside member to hold the center conductors from both above and under,
- the grounding member has an interconnecting strip for contacting to the individual outer conductors and a grounding strip extending from the interconnecting strip, and
- the grounding stripe is held by the topside member and the underside member of the insulator frame.

2. The ultrafine-coaxial-wire harness as defined by claim 1, wherein:
- the underside member has a pair of long rectangular portions and a pair of end portions each of which is connected to the long rectangular portions at their ends; and
- the pair of long rectangular portions and the pair of end portions together form a window portion such that they surround the window portion, which exposes the center conductors.

3. The ultrafine-coaxial-wire harness as defined by claim 2, wherein the alignment portion is formed by using a pair of alignment holes each provided at one of the end portions of the insulator frame.

4. The ultrafine-coaxial-wire harness as defined by claim 3, wherein:
- the grounding member further includes an engaging portion that engages with the exposed portions of the individual outer conductors, and
- the individual outer conductors are sandwiched by the engaging portion and the interconnecting strip.

5. The ultrafine-coaxial-wire harness as defined by claim 2, wherein:
- the grounding member further includes an engaging portion that engages with the exposed portions of the individual outer conductors, and
- the individual outer conductors are sandwiched by the engaging portion and the interconnecting strip.

6. The ultrafine-coaxial-wire harness as defined by claim 1, wherein:
- the grounding member further includes an engaging portion that engages with the exposed portions of the individual outer conductors, and
- the individual outer conductors are sandwiched by the engaging portion and the interconnecting strip.

7. A connecting method of an ultrafine-coaxial-wire harness, the connecting method being a method of connecting the ultrafine-coaxial-wire harness as defined by claim 1 to a circuit board having a plurality of circuit members, the connecting method comprising a step of connecting the individual center conductors to the circuit members of the circuit board by performing alignment using the alignment portion as a reference.

8. The connecting method of the ultrafine-coaxial-wire harness as defined by claim 7, the connecting method further comprising, before performing the step of connecting, the steps of:
- aligning the individual center conductors of the ultrafine coaxial wires between the topside member and the underside member, both of which have a common guide hole, by using the guide holes as a reference and fixing the center conductors; and
- forming an alignment hole as the alignment portion in the topside member and the underside member.

9. A circuit-board-connected body, comprising:
- a circuit board provided with a plurality of circuits; and an ultrafine-coaxial-wire harness provided on the circuit board, the ultrafine-coaxial-wire harness being the ultrafine-coaxial-wire harness as defined by claim 1.

10. A circuit-board module, comprising:

a circuit-board-connected body as defined by claim 9; and an electronic component mounted on the circuit board.

11. An electronic apparatus, comprising a circuit-board module as defined by claim 10.

12. The ultrafine-coaxial-wire harness as defined by claim 1, wherein the grounding stripe extends perpendicularly to a longer side of the interconnecting stripe.

* * * * *